United States Patent
Chang et al.

(10) Patent No.: US 9,582,898 B2
(45) Date of Patent: Feb. 28, 2017

(54) ELECTRONIC DEVICE FOR CHROMATIC ABERRATION COMPENSATION

(71) Applicant: ABILITY ENTERPRISE CO., LTD., New Taipei (TW)

(72) Inventors: Chia-Feng Chang, New Taipei (TW); Yi-Jian Lee, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 14/584,304

(22) Filed: Dec. 29, 2014

(65) Prior Publication Data
US 2015/0187079 A1  Jul. 2, 2015

(30) Foreign Application Priority Data
Dec. 31, 2013 (TW) .............................. 102149338 A

(51) Int. Cl.
*G06T 7/40* (2006.01)
*G06T 7/60* (2006.01)
(52) U.S. Cl.
CPC ............... *G06T 7/408* (2013.01); *G06T 7/60* (2013.01); *G06T 2207/10024* (2013.01)
(58) Field of Classification Search
CPC .. G06T 7/408; G06T 7/60; G06T 2207/10024
USPC ................................................. 382/167, 275
See application file for complete search history.

(56) References Cited

U.S. PATENT DOCUMENTS

| | | | | |
|---|---|---|---|---|
| 8,605,329 B2 * | 12/2013 | Shestak | ............... | H04N 1/6022 358/1.9 |
| 2002/0003755 A1 * | 1/2002 | Fujita | ................... | G11B 7/0901 369/44.23 |
| 2006/0078215 A1 * | 4/2006 | Gallagher | ................. | G06T 3/00 382/254 |
| 2006/0170669 A1 * | 8/2006 | Walker | .................. | G06F 3/0362 345/418 |
| 2009/0052769 A1 | 2/2009 | Kang et al. | | |

(Continued)

FOREIGN PATENT DOCUMENTS

| | | |
|---|---|---|
| CN | 101374191 A | 2/2009 |
| CN | 102017639 A | 4/2011 |
| CN | 102685511 A | 9/2012 |

OTHER PUBLICATIONS

Reicherter et al. ("Dynamic correction of aberrations in microscopic imaging systems using an artificial point source," Proc. SPIE vol. 5462, Sep. 10, 2004).*

(Continued)

*Primary Examiner* — Yubin Hung
(74) *Attorney, Agent, or Firm* — Rabin & Berdo, P.C.

(57) ABSTRACT

An electronic device comprises a computing module and a storing module. The computing module receives a first image having a first region with two spots, determining whether a first interval between the spots of the first region is larger than a threshold, computing the first image with a parameter of a parameter set for obtaining a second image having a second region corresponding to the first region with two spots if the first interval is larger than the threshold, and determining whether a second interval between the spots of the second region is larger than the threshold. The storing module records the parameter, if the second interval is smaller than or equal to the threshold.

19 Claims, 5 Drawing Sheets

(56) References Cited

U.S. PATENT DOCUMENTS

| | | | |
|---|---|---|---|
| 2009/0129804 A1* | 5/2009 | Shoji | G03G 15/50 399/72 |
| 2009/0231416 A1* | 9/2009 | Kasahara | H04N 9/045 348/36 |
| 2010/0302384 A1* | 12/2010 | Sawada | H04N 5/23248 348/208.4 |
| 2011/0115941 A1* | 5/2011 | Kim | H04N 5/2256 348/223.1 |
| 2012/0113278 A1* | 5/2012 | Okada | H04N 5/217 348/208.4 |
| 2012/0212644 A1 | 8/2012 | Nashizawa | |
| 2013/0141538 A1* | 6/2013 | DaneshPanah | H04N 5/23219 348/46 |
| 2013/0188035 A1* | 7/2013 | Goodwin | G02B 21/34 348/79 |
| 2013/0208151 A1* | 8/2013 | Stec | H04N 17/002 348/242 |

OTHER PUBLICATIONS

Fang et al. ("Eliminating lateral color aberration of a high-resolution digital projection lens using a novel genetic algorithm," Opt. Eng. 46(7), Jul. 24, 2007).*
Chinese Office Action dated Jul. 4, 2016.

* cited by examiner

ELECTRONIC DEVICE FOR CHROMATIC ABERRATION COMPENSATION

This application claims the benefit of Taiwan application Serial No. 102149338, filed Dec. 31, 2013, the disclosure of which is incorporated by reference herein in its entirety.

TECHNICAL FIELD

The present invention relates to a setting method of image compensating parameters, an electronic device, a storage medium and a computer program product, and more particularly to a setting method of image compensating parameters, an electronic device, a storage medium and a computer program product for searching a preferred chromatic aberration compensating parameter.

BACKGROUND

"Chromatic aberration" is a common deficiency of a lens in which when hybrid light passes through the lens to form an image, there is a failure of the lens to focus the color lights with various wavelengths on the same point because the lens has different refractive indices for different wavelengths of the color lights. In general, chromatic aberration can be divided into longitudinal chromatic aberration and transverse chromatic aberration. Both of them causes color defusing shifting. Usually, a foreground object on the focusing plane produces a reddish image whereas a background object on the focusing plane produces a bluish image.

Therefore, there is a need for providing a setting method for image compensating parameters, an electronic device, a storing medium and a computer program product.

SUMMARY

In order to solve the abovementioned problems, the present invention provides a setting method of image compensating parameters. The setting method of image compensating parameters of the present invention comprises: a first image is received, wherein the first image comprises a first region including two spots; a first interval between the spots is determined whether it is larger than a threshold value, if the first interval is larger than the threshold value, the first image is computed with a parameter of a parameter set through a computing procedure and a second image is obtained, wherein the second image comprises a second region including two spots. Furthermore, in a determining procedure, a second interval between the spots of the second region is determined whether it is larger than the threshold value, if the second interval is smaller than or equal to the threshold value, the parameter is recorded.

The present invention further provides a setting method of image compensating parameters. The setting method of image compensating parameters of the present invention comprises: a first image is received, wherein the first image comprises a first region including two spots; a first interval between the spots is determines whether it is larger than a threshold value, if the first interval is larger than the threshold value, a zooming capturing level of the first image is determined and a weighting of a parameter set is adjusted. Furthermore, through a computing procedure, the first image is computed with the adjusted parameter set and a second image is obtained, wherein the second image comprises a second region corresponding to the first region, and the second region includes two spots. In a determining procedure, a second interval between the spots of the second region is determined whether it is larger than the threshold value, if the second interval is smaller than or equal to the threshold value, a parameter corresponding to the second image is recorded.

The present invention further provides a program. The program of the present invention can be executed on an electronic device. After the electronic device loads and starts the program, the electronic device may execute the abovementioned setting method of image compensating parameters.

The present invention further provides an electronic device readable storage medium. The electronic device readable storage medium of the present invention may store the abovementioned program. After the electronic device loads and starts the program in the storage medium, it may execute the abovementioned setting method of image compensating parameters.

Moreover, the present invention further provides an electronic device. The electronic device of the present invention comprises a storing module and a computing module. The storing module stores a first image and a parameter set, wherein the first image includes a plurality of spots, and a first interval exists between any two of the spots. The computing module computes the first image according to a parameter of the parameter set when each of the first intervals is determined to be larger than a threshold value, wherein, if at least one first interval of the computed first image is smaller than or equal to the threshold value, the computing module makes the storing module store the parameter.

In addition, the present invention further provides an electronic device. The electronic device of the present invention comprises a storing module and a computing module. The storing module stores a first image and a parameter set, wherein the first image includes a plurality of spots, and a first interval exists between any two of the spots. The computing module computes the first image according to a parameter of the parameter set when at least one of the first interval is determined to be larger than a threshold value, wherein if each of the first intervals of the computed first image is smaller than or equal to the threshold value, the computing module makes the storing module store the parameter; if any one of the first interval of the computed first image is larger than the threshold value, the computing module computes the first image with another parameter of the parameter set or the computed first image.

DETAILED DESCRIPTION

Figure 1B:
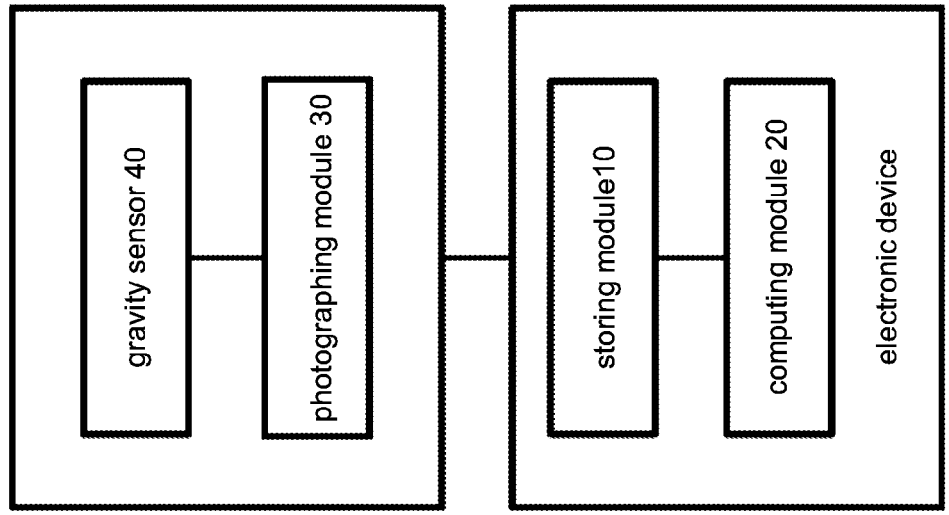
FIG. 1B shows a system configuration diagram according to another embodiment of the present invention.
Figure 1A:
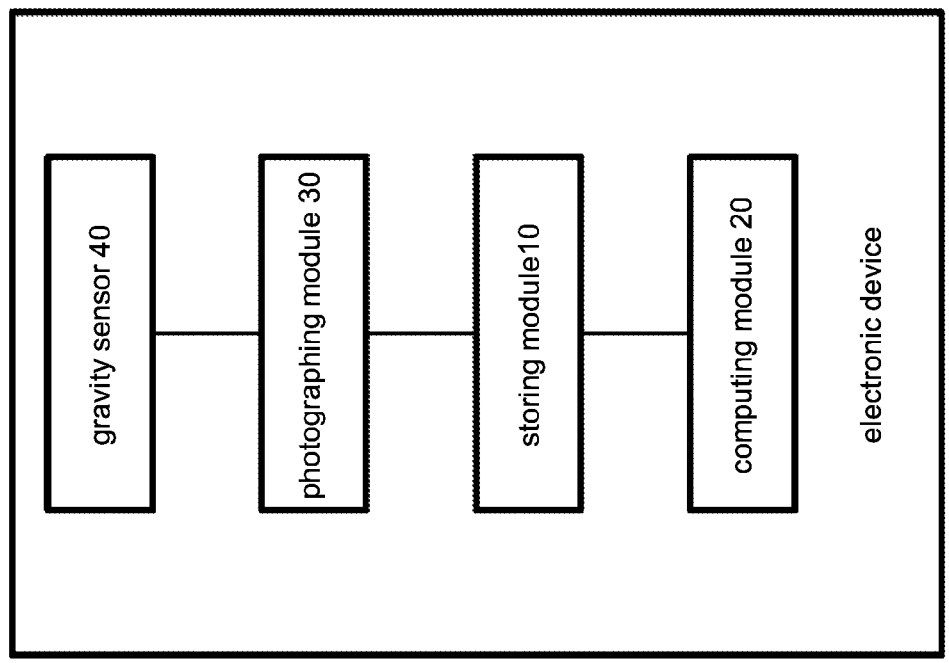
FIG. 1A shows a system configuration diagram according to an embodiment of the present invention.

FIG. 1A shows a system configuration diagram according to an embodiment of the present invention. FIG. 1B shows a system configuration diagram according to another embodiment of the present invention. As shown in FIG. 1A, an electronic device mainly comprises a storing module 10 and a computing module 20. In the present embodiment, the electronic device may further comprise a photographing module 30 and a gravity sensor 40. As shown in FIG. 1B, the photographing module 30 and the gravity sensor 40 can be additional to the electronic device, but the present invention is not limited thereto.

In an embodiment of the present invention, the electronic device can be a digital camera, a camcorder, a cell phone, a driving recorder, a tablet computer and etc. However, the present invention is not limited thereto.

The storage module 10 can be storage medium such as a memory and a hard disk. The computing module 20 may apply any type of general or specific integrated circuit such as a micro processor, a micro controller, a digital signal processor, a programming array and/or the like. Practically, the computing module 20 can be realized by system on chip (SoC), which is capable of utilizing any suitable processing circuit under the control of any suitable control logic. The photographing module 30 at least comprises a camera lens and an image sensing unit. The gravity sensor 40 (G-sensor) is, for example, an acceleration sensor or a inclination sensor, which is capable of recording the gravity direction.

In addition, without describing every possible variations and combinations, only preferred embodiments are described herein to avoid redundancy. However, one of ordinary skill in the art should understand that the above-mentioned modules are not all necessary. Furthermore, in order to implement the present invention, other detailed conventional modules or elements may be included as well. Each module or element may be omitted or modified according to needs, and it is not necessary to dispose other modules or elements between any two modules.

Figure 2:
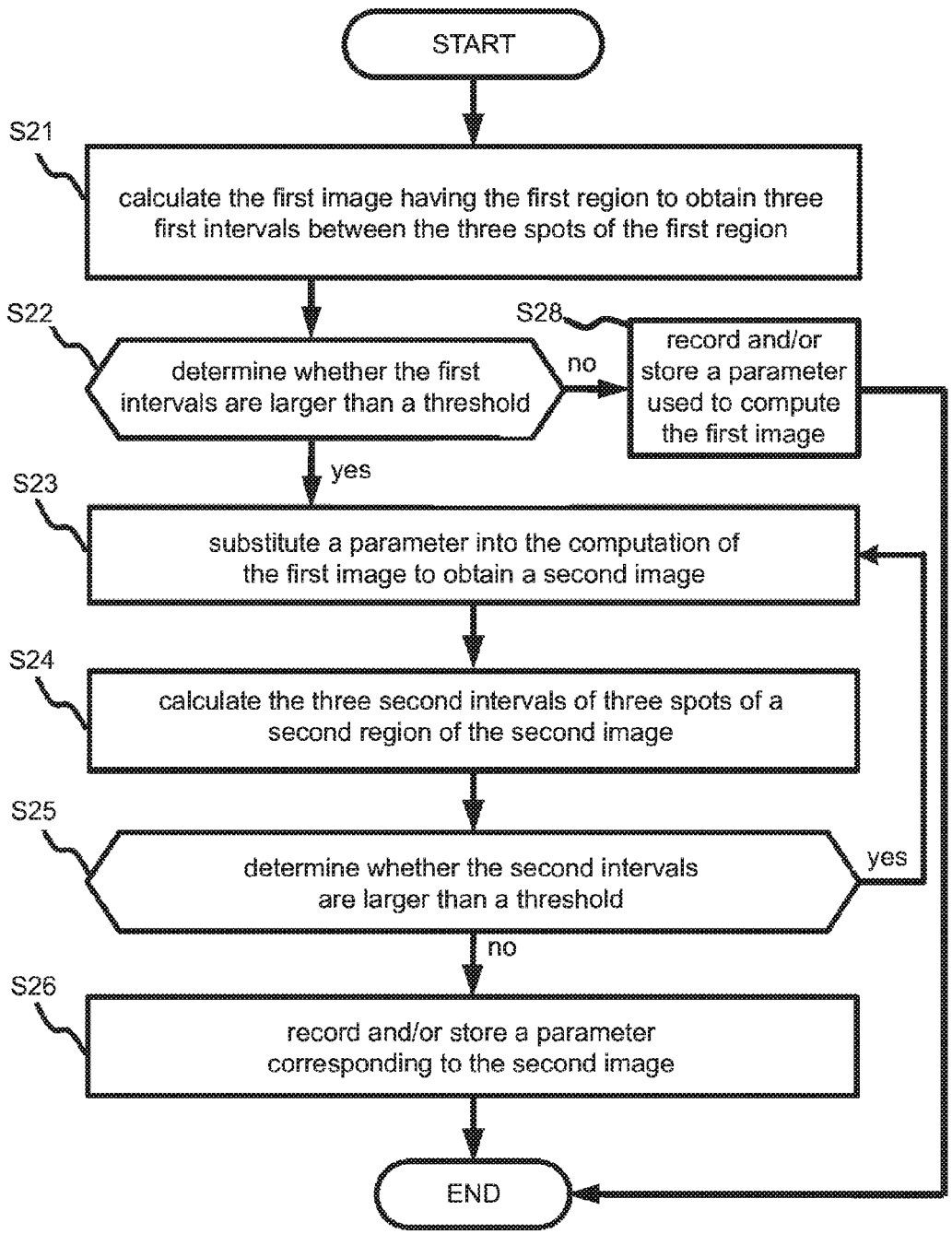
FIG. 2 shows a flow chart of a setting method of image compensating parameters according to an embodiment of the present invention.
Figure 3A:
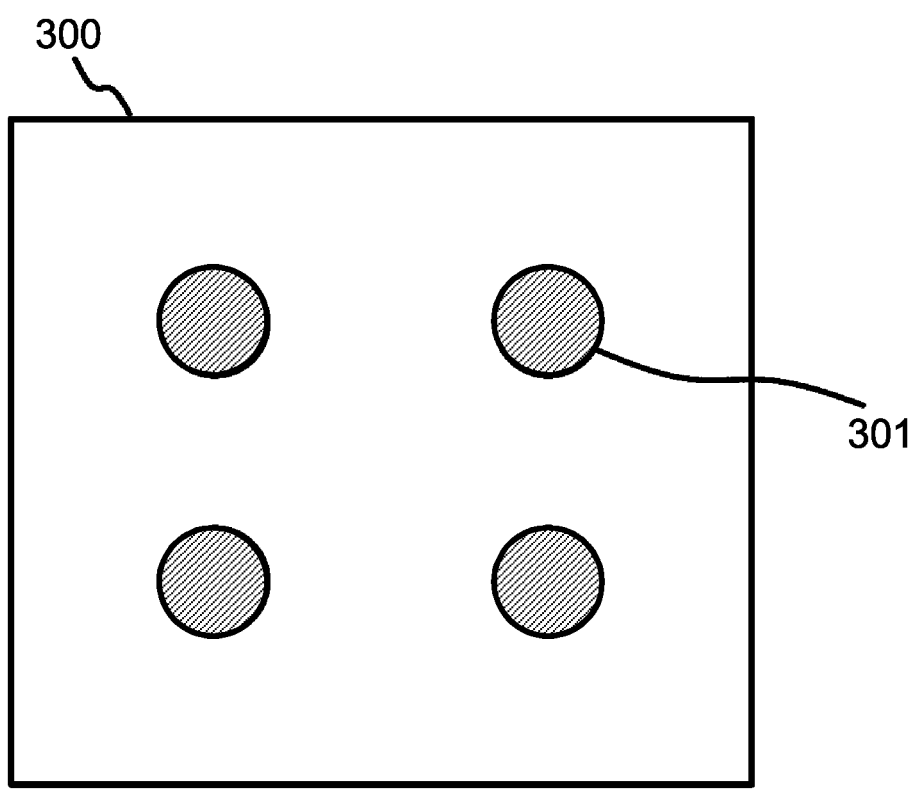
FIG. 3A shows a schematic diagram of a standard object and a standard region according to an embodiment of the present invention.
Figure 3B:
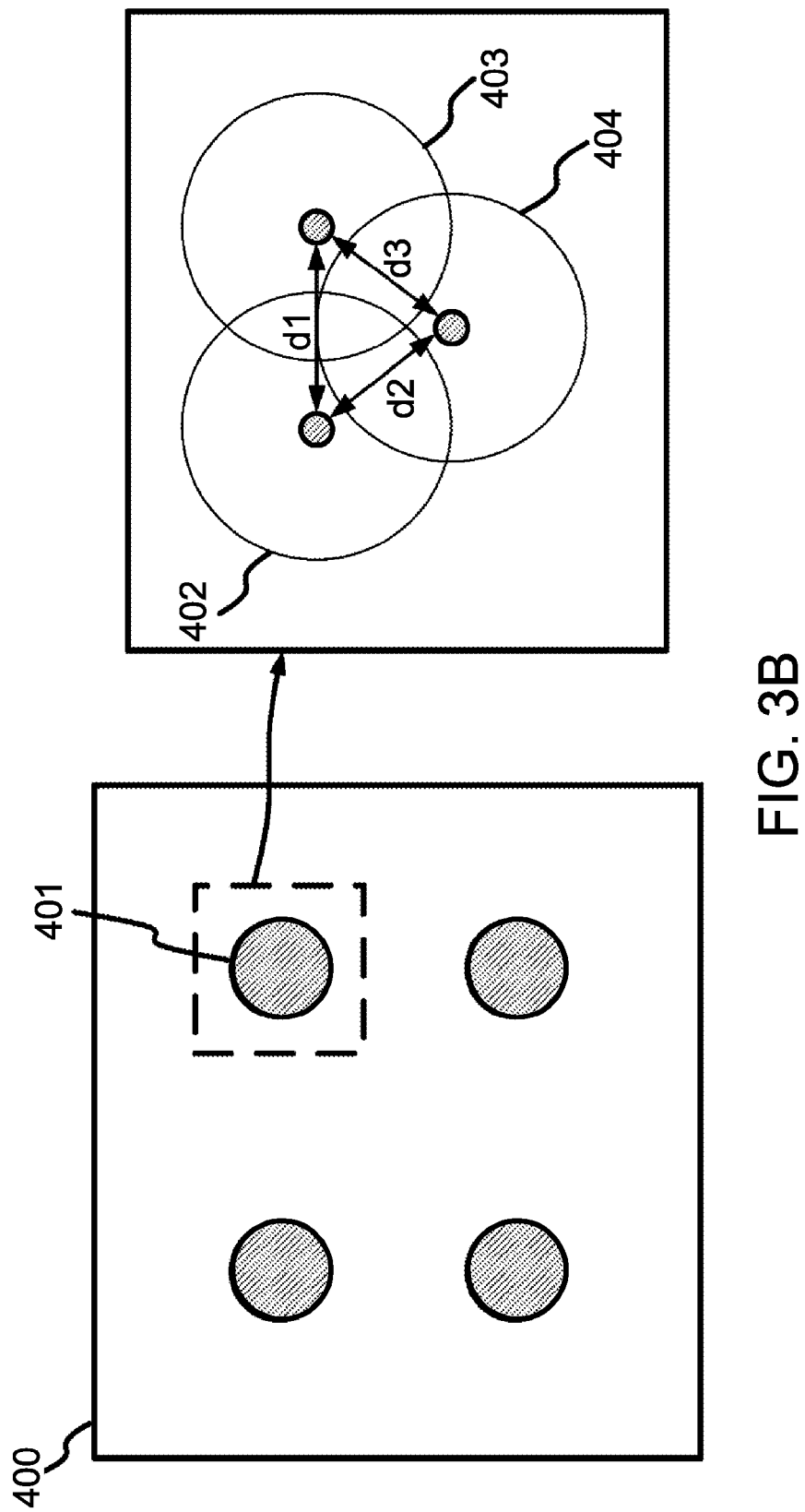
FIG. 3B shows a schematic diagram of a first image and a first region according to an embodiment of the present invention.
Figure 3C:
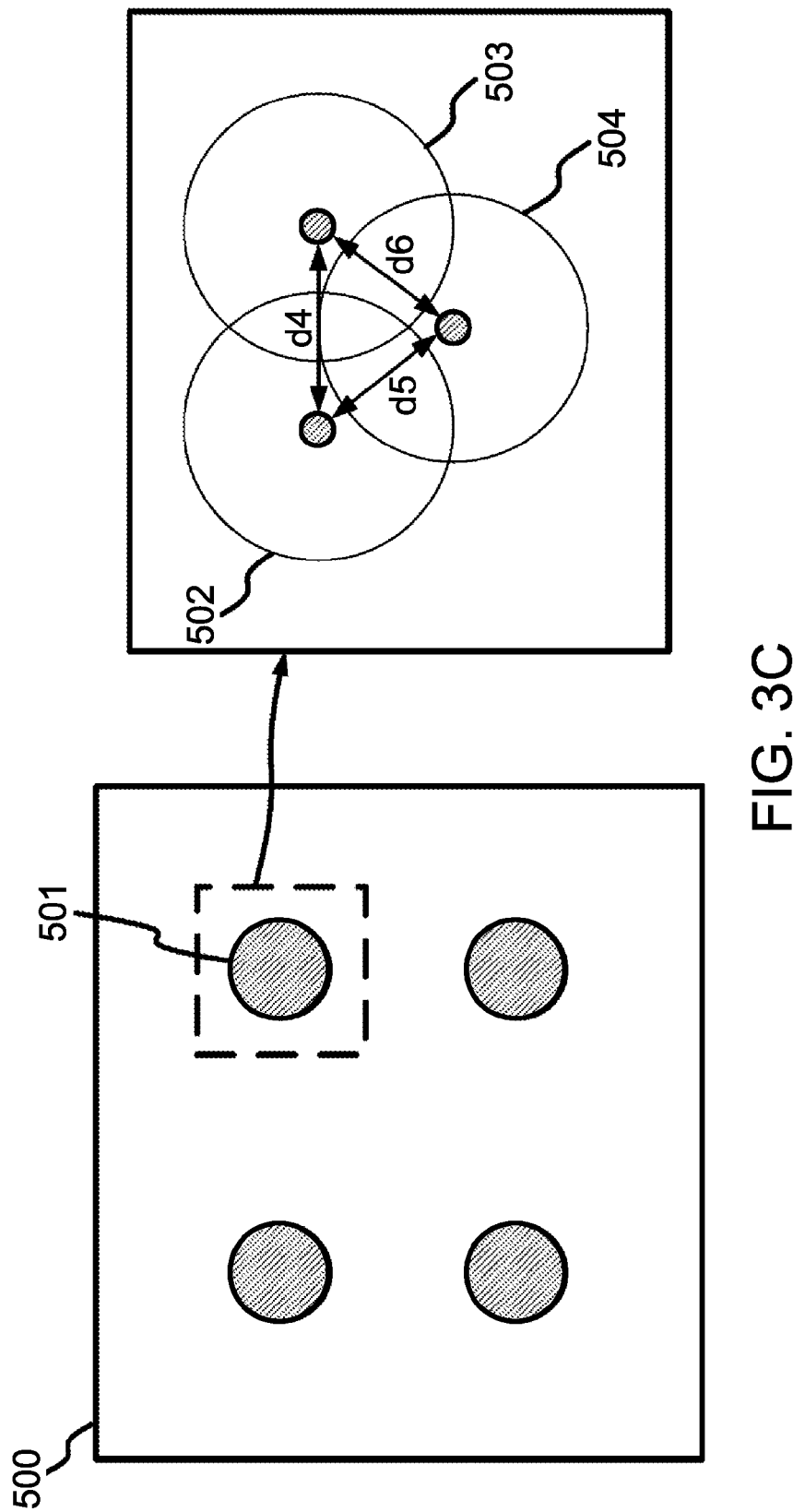
FIG. 3C shows a schematic diagram of a second image and a second region according to an embodiment of the present invention.

FIG. 2 shows a flow chart of a setting method of image compensating parameters according to an embodiment of the present invention. FIG. 3A shows a schematic diagram of a standard object and a standard region according to an embodiment of the present invention. FIG. 3B shows a schematic diagram of a first image and a first region according to an embodiment of the present invention. FIG. 3C shows a schematic diagram of a second image and a second region according to an embodiment of the present invention.

Below, the setting method of image compensating parameters of the present invention is described with reference to the system configuration shown in FIG. 1A or FIG. 1B together with FIG. 2. Please refer to FIGS. 3A-3C at the same time.

The photographing module 30 shoots the standard object 300 to obtain a first image 400 shown in FIG. 3B and stores the first image 400 in the storing module 10. The standard object 300 can be a test chart, such as a dot chart or any external image presented in a projecting manner or in a medium manner. In another embodiment, the first image 400 can also be an image having stored in the storing module 10.

Referring to FIG. 3A, the standard object 300 comprises a standard region 301. The first image 400 has a first region 401, wherein the first region 401 is corresponding to the standard region 301 of the standard object 300.

Chromatic aberration may occur in the first image 400, i.e., each spot of the first region 401 may be shifted. Specifically, the spot may be a small area of the first image and formed by essentially pure color from a narrow light-bandwidth. After receiving the first image 400, the computing module 20 computes the first image 400 having the first region 401 to obtain the intervals between the three spots of the first region 401. The spots may include a red spot (Red, R), a blue spot (Blue, B) and a green spot (Green, G), or at least two of the red spot, the blue spot and the green spot.

Referring to FIG. 2, at step S21: the first image 400 having the first region 401 is calculated to obtain three first intervals d1, d2, d3 between the three spots of the first region 401.

As shown in FIG. 3B, the first region 401 includes a red spot 402, a blue spot 403 and a green spot 404. The first intervals d1, d2, d3 between any two of the red spot 402, the blue spot 403 and the green spot 404 can be obtained by the computing module 20, wherein the first interval d1 is the interval between the red spot 402 and the blue spot 403, the first interval d2 is the interval between the red spot 402 and the green spot 404, and the first interval d3 is the interval between the blue spot 403 and the green spot 404. Specifically, the first interval d1 may be defined a distance between a center of the red spot 402 and a center of the blue spot 403, the first interval d2 may be defined a distance between a center of the red spot 402 and a center of the green spot 404, and the first interval d3 may be defined a distance between a center of the blue spot 403 and a center of the green spot 404. In another embodiment, the computing module 20 may only calculate at least one first interval of two spots of the first region, or calculate intervals of more than three spots. The present invention is not limited thereto.

Then, step S22 is performed: the first intervals d1, d2, d3 are determined whether they are larger than a threshold.

After obtaining the three first intervals d1, d2, d3 of the three spots of the first region 401, the computing circuit 20 determines whether the first intervals d1, d2, d3 are larger than a threshold value, respectively. If at least one of the first intervals d1, d2, d3 is larger than the threshold, step S23 is performed. In an embodiment, if the computing circuit 20 determines that each first interval d1, d2, d3 is larger than the threshold, step S23 is performed. The first image 400 comprises a plurality of pixels, and the threshold can be a distance value of 4 to 10 pixels of the first image 400, but the present invention is not limited thereto. In another embodiment, if at least one of the first intervals d1, d2, d3 is less than the threshold, the parameter is recorded and/or stored with "0" or null, as shown in step S28.

Then, step S23 is performed: electing a parameter, and the elected parameter is substituted into the computation of the first image 400 to obtain a second image 500. In an embodiment, a parameter set comprise a plurality of parameters, and each parameter has at least one element. For example, the parameter set is S={A, B, C . . . }, wherein A, B, C . . . are parameters; A=A(a1, a2, . . . ), B=B(b1, b2, . . . ), C=C(c1, c2, . . . ), and etc, wherein a1, a2, b1, b2, c1 and c2 are the elements of the parameters.

Referring to FIG. 3C, the computing module 20 performs computation with a parameter substitution of the first image 400 to obtain the second image 500. According to an embodiment of the present invention, the parameter can be selected from a parameter set. The parameter set can be determined by factors, such as photographing module, photographing parameter and photographing environment, and pre-stored in the storing module 10. In another embodiment, the parameter set may comprise a parameter collection or an equation.

Next, step S24 is performed: three second intervals d4, d5, d6 between three spots of a second region 501 of the second image 500 are calculated.

Referring to FIG. 3C, after obtaining the second image 500, the computing module 20 sets the second region 501 of the second image 500 in accordance with the first region 401 and obtains intervals of the three spots of the second region 501. As shown in FIG. 3C, the second region 501 comprises a red spot 502, a blue spot 503 and a green spot 504. The computing module 20 second intervals d4, d5, d6 between the red spot 502, blue spot 503 and the green spot 504. The second interval d4 is the interval between the red spot 502 and the blue spot 503, the second interval d5 is the interval between the red spot 502 and the green spot 504, and the second interval d6 is the interval between the blue spot 503 and the green spot 504.

Then, step S25 is performed: the second intervals d4, d5, d6 are determined whether they are larger than a threshold.

After obtaining the three second intervals d4, d5, d6 of the second region 501, the computing module 20 respectively determines whether the second intervals d4, d5, d6 are larger than a threshold. If at least one second interval d4, d5, d6 is larger than the threshold, it goes back to step S23, and another parameter is used to compute the first image 400, and then, steps S24 and S25 are performed. On the other hand, if each second interval d4, d5, d6 is smaller or equal to the threshold, step S26 is performed. The second image 500 comprises a plurality of pixels, and the threshold can be a distance value of 4 to 10 pixels of the second image 500.

In an embodiment, at step S25, the computing module 20 goes back to step S23 when all of the three second intervals d4, d5, d6 are larger than the threshold. In such instance, the computing module 20 may use another parameter to compute the first image 400 again, but the present invention is limited thereto. On the other hand, if at least one of the second intervals d4, d5, d6 is smaller than or equal to the threshold, then step S26 is performed.

In another embodiment, the computing module 20 can use another parameter of the parameter set in accordance with the differences between the second intervals d4, d5, d6 and the threshold when repeating step S23. The parameter to be used is not particularly limited. Specifically, the computing module 20 may choose another parameter by comparing the differences between the first intervals d1, d2, d3 and the threshold with the differences between the second intervals d4, d5, d6 and the threshold.

In still another embodiment, if it still fails to obtain a parameter which is able to make the second intervals d4, d5, d6 be smaller than or equal to the threshold after completing steps S23 to step S25, a preferred parameter is recorded. Specifically, if at step S25 it decides that at least one of the second intervals d4, d5, d6 is larger than the threshold, the computation module 20 may compare the first intervals d1, d2, d3 with the second intervals d4, d5, d6. For example, if a sum of the second intervals d4, d5, d6 is smaller than a sum of the first intervals d1, d2, d3, a parameter corresponding to the second image 500 is recorded. If the sum of the second intervals d4, d5, d6 is larger than or equal to the sum of the first intervals d1, d2, d3, a predetermined value is recorded. The predetermined value can be a parameter equivalently corresponding to the first image 400. The predetermined value can be an empty value, and in practical, it can be set as 0 or 1, but the present invention is not limited thereto.

Moreover, in another embodiment, after repeating several times of steps S23 to S25, the computing module 20 may compare the sum of the first intervals d1, d2, d3 with several sums of the second intervals d4, d5, d6 to decide a parameter able to obtain the minimal sum of the first intervals d1, d2, d3 or the minimal sum of the second intervals d4, d5, d6. The parameter is recorded by the storing module 10. If any one of the sums of the second intervals d4, d5, d6 is smaller than the sum of the first intervals d1, d2, d3 and other sums of the second intervals d4, d5, d6, a parameter corresponding to the second image 500 is recorded and stored. If the sum of the first intervals d1, d2, d3 is smaller than or equal to the sums of the second intervals d4, d5, d6 obtained from the several times of computation, a predetermined value is recorded and stored. The number of repetitions of steps S23 to S25 can be two or more.

Then, step S26 is performed: a parameter corresponding to the second image is recorded and/or stored.

After the computing module 20 determines that each second interval d4, d5, d6 is smaller than or equal to the threshold, the storing module 10 records and/or stores the parameter corresponding to the second image 500. However, the present invention is not limited thereto. In another embodiment, after the computing module 20 determines that at least one second interval d4, d5, d6 is smaller than or equal to threshold, the storing module 10 records and/or stores the parameter corresponding to the second image 500.

Referring to FIGS. 1A, 1B and FIG. 2 again, in an embodiment, the parameter set may comprise a parameter x set for compensating the chromatic aberration of red spot 502 and a parameter y set for compensating the chromatic aberration of blue spot 503. In a case that the first image 400 is an image hard to be determined by a foreground/background or that no other images shall be determined in advance, step S23 is performed in which the computing module 20 substitutes a parameter x of the parameter set into the computation of first image 400 or substitutes a parameter y of the parameter set into the computation of first image 400, if at steps S22 or S25 the computing module 20 determines that the intervals between the spots of the first image 400 are larger than the threshold. The first image 400 can be a planar image.

In another embodiment, a parameter of the parameter set may comprise a first sub parameter and a second sub parameter. The first sub parameter is capable of compensating the chromatic aberration of the red spot 502. The second sub parameter is capable of compensating the chromatic aberration of the blue spot 503. For example, the parameters comprises m first sub parameters and n second sub parameters. The first sub parameters and second sub parameters have mxn parameter combinations. Therefore, at step S23, the computing module 20 may use one of the parameter combinations to compute the first image 400. In an embodiment, there are 5 to 15 first sub parameters and 5 to 15 second sub parameters, and the parameter may have 25 to 255 combinations.

Specifically, if the first image 400 is an identifiable image for a foreground and/or a background, the computing circuit 20 may substitute a first sub parameter into the computation of the foreground region and substitute a second sub parameter into the computation of the background region at the same time according to the foreground/background regions of the first image 400, wherein the first image 400 can be a three-dimensional image. In still another embodiment, the electronic device may capture a first image 400 which is identifiable for foreground and/or a background. For example, a twin-lens camera may utilize twin-lenses to capture a frame of the first image 400 with different view angles generated by different optical paths.

In addition, referring to FIGS. 1A, 1B and FIG. 2 again, the setting method of image compensating parameters of the present invention can be applied in an electronic device capable of sensing rotation angles. In an embodiment, if the electronic device comprises the photographing module 30 and the photographing module 30 comprises a gravity sensor 40, the gravity direction (bottom) of the first image 400 can be determined because when the photographing module 30 captures the first image 400, the gravity sensor 40 may record the rotation angles during the photographing. Specifically, in common, the gravity direction (bottom) of an image is usually a foreground (close view) whereas the top is usually a background (far view), thus, the computing module 20 may preset the gravity direction of the first image 400 as the foreground, performing computations with different parameter sets in accordance with the foreground/background of the first image 400.

In another embodiment, when the computing module 20 determines that all of the second intervals d4, d5, d6 are larger than or equal to the first intervals d1, d2, d3, the computing module 20 computes the first image 400 with another parameter. On the other hand, if at least one second interval d4, d5, d6 is smaller than the first interval d1, d2, d3, the second image 500 is computed with another parameter. At this time, it is equivalent to using a plurality of parameters to compute the first image 400.

In an embodiment, if the computing module 20 determines that the first intervals d1, d2, d3 are larger than the threshold, it further determines the zooming capturing level of the first image 400 and adjusts a weighting of the parameter set in accordance with the zooming capturing level, and then computes the first image 400 with the adjusted parameter set.

In another embodiment, after the computing module 20 obtains an appropriate parameter, it may further adjust the parameter in accordance with the zooming capturing level of the photographing module 30. For example, if an electronic device has 20 zooming capturing levels and using the 10th zooming capturing level when photographing a standard object 300, a parameter applicable in each zooming capturing levels can be obtained by multiplying the obtained parameter by different weightings in accordance with different zooming capturing levels. It does not need to respectively find the most appropriate parameter for each zooming capturing level.

Alternatively, in still another embodiment, 20 zooming capturing levels are divided into two groups, former and latter, each having 10 levels. The former 10 levels use the parameter of the 5th level while the latter 10 levels use the parameter of the 15th level. Here it is to be noted that the setting method of image compensating parameters of the present invention is not limited to the abovementioned order of performing the steps, and the order of performing the steps can be modified as long as the goal of the present invention can be achieved.

Moreover, the setting method of image compensating parameters of the present invention can be realized by a program and stored in an electronic device.

In an embodiment, after the electronic device loads and starts the program, the electronic device receives a first image 400, wherein the first image 400 comprises a first region 401 including at least two spots; then, the electronic device receives determines whether the first intervals d1, d2, d3 between each two spots are larger than a threshold; if the first intervals d1, d2, d3 are larger than the threshold, the electronic device computes the first image 400 with a parameter of a parameter set and obtains the second image 500, wherein the second image 500 comprises a second region 501 corresponding to the first region 401, and the second region 501 includes two spots; the electronic device determines whether the second intervals d4, d5, d6 between the two spots of the second region 501 are larger than the threshold, and if the second interval d4, d5, d6 are smaller than or equal to the threshold, a parameter corresponding to the second image is recorded and/or stored.

Moreover, the setting method of image compensating parameters of the present invention can be realized by a program and built in an electronic device readable storage medium, such as a hard disc, a floppy disk and a CD-ROM.

In an embodiment, the readable storage medium is built in an electronic device and the program is loaded by the electronic device. After the program is started, the electronic device receives the first image 400, wherein the first image 400 comprises a first region 401 including a plurality of spots; the electronic device determines whether the first intervals d1, d2, d3 between the spots is larger than a threshold; if the first intervals d1, d2, d3 are larger than the threshold, the electronic device computes the first image 400 with a parameter of a parameter set to obtain the second image 500. The second image 500 comprises a second region 501 corresponding to the first region 401, and the second region 501 also includes a plurality of spots; the electronic device determines whether the second intervals d4, d5, d6 between the spots of the second region 501 are larger than the threshold, and if the second intervals d4, d5, d6 are smaller than or equal to the threshold, a parameter corresponding to the second image is recorded and/or stored. If the second intervals d4, d5, d6 are still larger than the threshold, the electronic device keeps computing the first image 400 or the second image 500 with the parameter set.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electronic device, comprising:
a computing circuit, receiving a first image having a first region with two spots, determining whether a first interval between the spots of the first region is larger than a threshold, computing the first image with a parameter of a parameter set and obtaining a second image having a second region with two spots, the second region corresponding to the first region if the first interval is larger than the threshold, and determining whether a second interval between the spots of the second region is larger than the threshold; and
a storing module recording and/or storing the parameter if the second interval is smaller than or equal to the threshold.

2. The electronic device of claim 1, wherein if the second interval is larger than the threshold, the computing circuit further computes the first image or the second image with the parameter set and determines whether the first interval of the computed first image or the second interval of the computed second image is larger than the threshold.

3. The electronic device of claim 2, wherein the first image is an identifiable image for a foreground and/or a background, a three-dimensional image and/or a determinable image for a gravity direction.

4. The electronic device of claim 1, wherein the parameter is provided from the parameter set to the computing circuit for computing in accordance with a gravity direction of the first image.

5. The electronic device of claim 1, wherein if the second interval is larger than the threshold, the computing circuit further compares the first interval and the second interval, and the storing module records and/or stores the parameter if the second interval is smaller than the first interval or a predetermined value if the second interval is larger than or equal to the first interval.

6. The electronic device of claim 1, further comprising a photographing module for capturing the first image.

7. An electronic device, comprising:

a computing circuit, receiving a first image having a first region with two spots, determining whether a first interval between the spots of the first region is larger than a threshold, determining a zooming capturing level of the first image and adjusting a weighting of a parameter set if the first interval is larger than the threshold, computing the first image with the adjusted parameter set and obtaining a second image having a second region with two spots, the second region corresponding to the first region, and determining whether a second interval between the spots of the second region is larger than the threshold; and a storing module recording and/or storing a parameter of the adjusted parameter set corresponding to the second image if the second interval is smaller than or equal to the threshold.

8. The electronic device of claim 7, wherein if the second interval is larger than the threshold, the computing circuit further computes the first image or the second image with the parameter set and determines whether the first interval of the computed first image or the second interval of the computed second image is larger than the threshold.

9. The electronic device of claim 7, wherein the first image is an identifiable image for a foreground and/or a background, a three-dimensional image and/or a determinable image for a gravity direction, and the parameter is provided from the parameter set to the computing circuit for computing in accordance with the gravity direction of the first image.

10. The electronic device of claim 7, wherein if the second interval is larger than the threshold, the computing circuit further compares the first interval and the second interval, and the storing module records and/or stores the parameter if the second interval is smaller than the first interval or a predetermined value if the second interval is larger than or equal to the first interval.

11. The electronic device of claim 7, further comprising a photographing module for capturing the first image.

12. An electronic device, comprising:

a storing module, storing a first image and a parameter set, the first image has a plurality of spots, and any two of the spots has a first interval between them; and a computing circuit, computing the first image with a parameter of the parameter set and obtaining second intervals corresponding to the first intervals when each the first intervals is larger than a threshold;

wherein, if at least one of the second intervals is smaller than or equal to the threshold, the storing module records and/or stores the parameter.

13. The electronic device of claim 12, wherein the computing circuit adjusts the parameter set with a weighting in accordance with a zooming capturing level before computing the first image.

14. The electronic device of claim 12, further comprising a photographing module for capturing the first image.

15. The electronic device of claim 12, further comprising a gravity sensor that records a rotation angle of the electronic device and/or a gravity direction of the first image.

16. The electronic device of claim 12, wherein the threshold is a distance value of 4 to 10 pixels of the first image.

17. An electronic device, comprising:

a storing module storing a first image and a parameter set, the first image having a plurality of spots, and any two of the spots having a first interval between them; and a computing circuit, determining at least one of the first intervals is larger than a threshold and computing the first image with a parameter of the parameter set and obtaining second intervals corresponding to the first intervals;

wherein the storing module records and/or stores the parameter if each of the second intervals is smaller than or equal to the threshold, or the computing circuit computes the first image or the computed first image with another parameter of the parameter set if any one of the second intervals is larger than the threshold.

18. The electronic device of claim 17, wherein the computing circuit adjusts the parameter set with a weighting in accordance with a zooming capturing level before computing the first image.

19. The electronic device of claim 17, further comprising a gravity sensor that records a rotation angle of the electronic device and/or a gravity direction of the first image.

* * * * *